(12) United States Patent
Chuang

(10) Patent No.: US 7,575,207 B2
(45) Date of Patent: Aug. 18, 2009

(54) COLLAPSIBLE STAND FOR BICYCLE

(76) Inventor: Louis Chuang, 8th Floor-4, No. 20, Ta Lon Road, Taichung (TW)

( * ) Notice: Subject to any disclaimer, the term of this patent is extended or adjusted under 35 U.S.C. 154(b) by 217 days.

(21) Appl. No.: 11/778,810

(22) Filed: Jul. 17, 2007

(65) Prior Publication Data
US 2008/0087776 A1    Apr. 17, 2008

(30) Foreign Application Priority Data
Oct. 14, 2006   (TW) ............................. 95137910 A

(51) Int. Cl.
*F16M 11/38* (2006.01)
*B62H 7/00* (2006.01)
(52) U.S. Cl. ....................................... 248/168; 280/293
(58) Field of Classification Search ................ 248/168, 248/166, 150, 173, 525; 211/5, 17–22; 280/293, 280/294, 297, 300, 304, 298, 299, 302, 288.4; 245/351, 121; 70/235; 74/544.1
See application file for complete search history.

(56) References Cited
U.S. PATENT DOCUMENTS

| | | | | |
|---|---|---|---|---|
| 683,463 A | * | 10/1901 | Helmer | 280/300 |
| 3,980,320 A | * | 9/1976 | Marchello | 280/293 |
| 5,025,932 A | * | 6/1991 | Jay | 211/20 |
| D411,488 S | * | 6/1999 | Tarrence | D12/115 |
| 6,027,133 A | * | 2/2000 | Phillips | 280/293 |
| 6,412,805 B1 | * | 7/2002 | Chen | 280/302 |
| 7,059,622 B2 | * | 6/2006 | Chuang | 280/293 |

* cited by examiner

Primary Examiner—George Nguyen
Assistant Examiner—Christopher Garft
(74) Attorney, Agent, or Firm—Alan Kamrath; Kamrath & Associates PA

(57) ABSTRACT

A collapsible stand for bicycle includes a body having a first end, a second end, and a chamber which can receive a crank of a bicycle. A positioning device is movable in the chamber and selectively lockable at the first and the second end of the body. Two supporting legs, each supporting leg includes a first end being pivotally connected with the positioning device and a second end adapted to abut against a supporting surface, wherein the supporting legs are received in the body when the positioning device is at first end of the body, wherein the supporting legs are exposed from the body when the positioning device is at second end of the body.

15 Claims, 11 Drawing Sheets

COLLAPSIBLE STAND FOR BICYCLE

BACKGROUND OF THE INVENTION

1. Field of the Invention

The present invention relates to a stand for a bicycle, in particular, to such a stand that is collapsible.

2. Description of the Related Art

FIG. 11 shows a conventional stand 1 that is used to support a bicycle frame to maintain the bicycle in an upright position. The stand 1 is comprised of a hollow body 2 and four supporting legs 3. The hollow body 2 of the stand 1 provides a pocket for receiving a crank 4 of the bicycle in a support configuration. However, the stand 1 is quite heavy to carry, bulky and can not effectively reduce its size to facilitate convenient carrying and storage of the stand 1.

The present invention is, therefore, intended to obviate or at least alleviate the problems encountered in the prior art.

SUMMARY OF THE INVENTION

A collapsible stand for bicycle includes a body having a first end, a second end, and a chamber which can receive a crank of a bicycle. A positioning device is movable in the chamber and selectively lockable at said first and the second end of the body. Two supporting legs, each supporting leg includes a first end being pivotally connected with the positioning device and a second end adapted to abut against a supporting surface, wherein the supporting legs are received in said body when said positioning device is at first end of the body, wherein the supporting legs are exposed from the body when said positioning device is at second end of the body.

It is an objective of the collapsible stand of the present invention is that the two supporting legs are collapsible and be stowed in the body in order to facilitate convenient carrying and storage of the stand.

It is another objective of the present invention that the stand is light-weighted and can effectively support the bicycle in an upright position.

Other objectives, advantages, and novel features of the invention will become more apparent from the following detailed description when taken in conjunction with the accompanying drawings.

DETAILED DESCRIPTION OF THE PREFERRED EMBODIMENT

Figure 9:
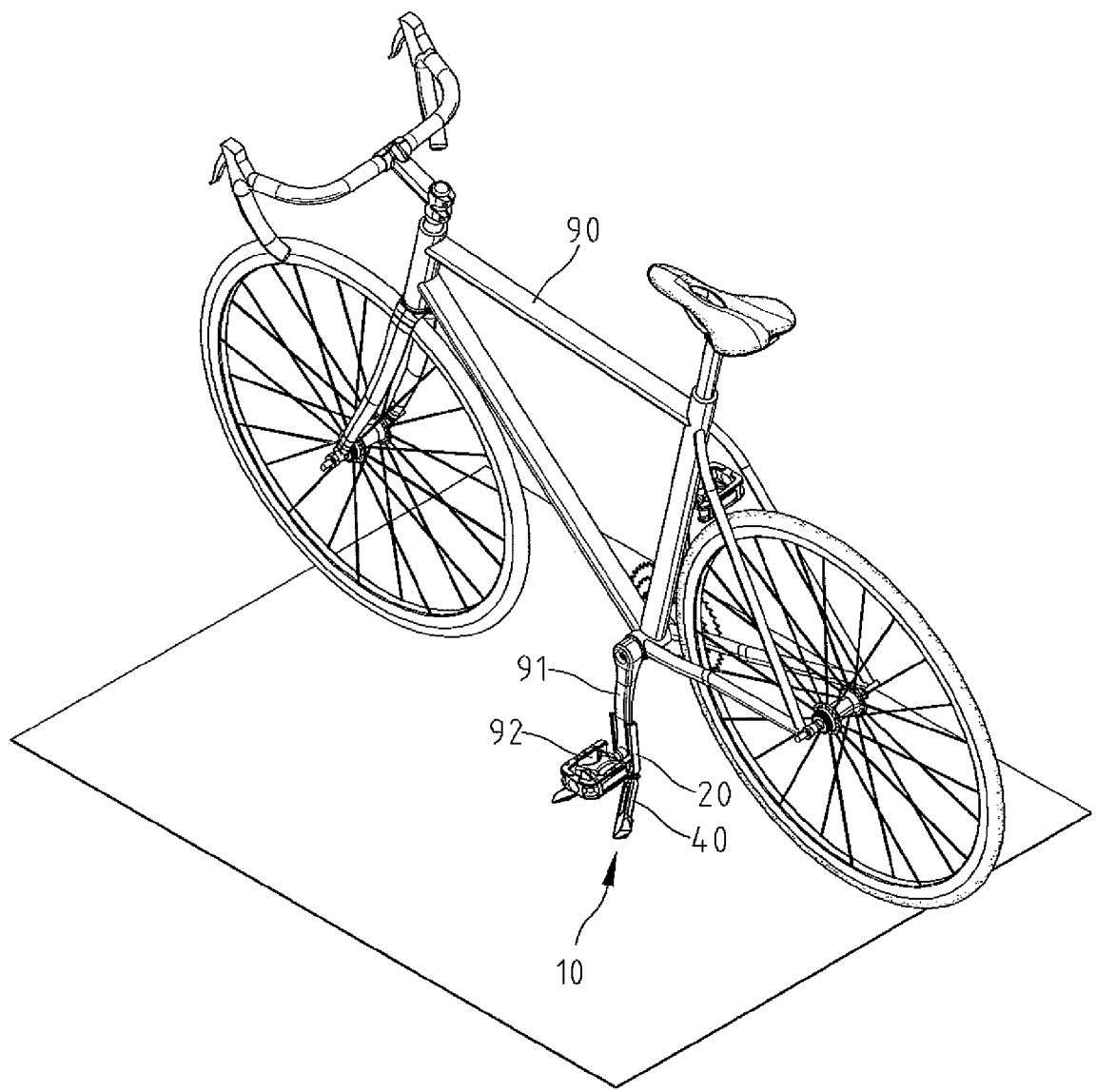
FIG. 9 is a perspective view illustrating the use of the collapsible stand with a bicycle.
Figure 10:
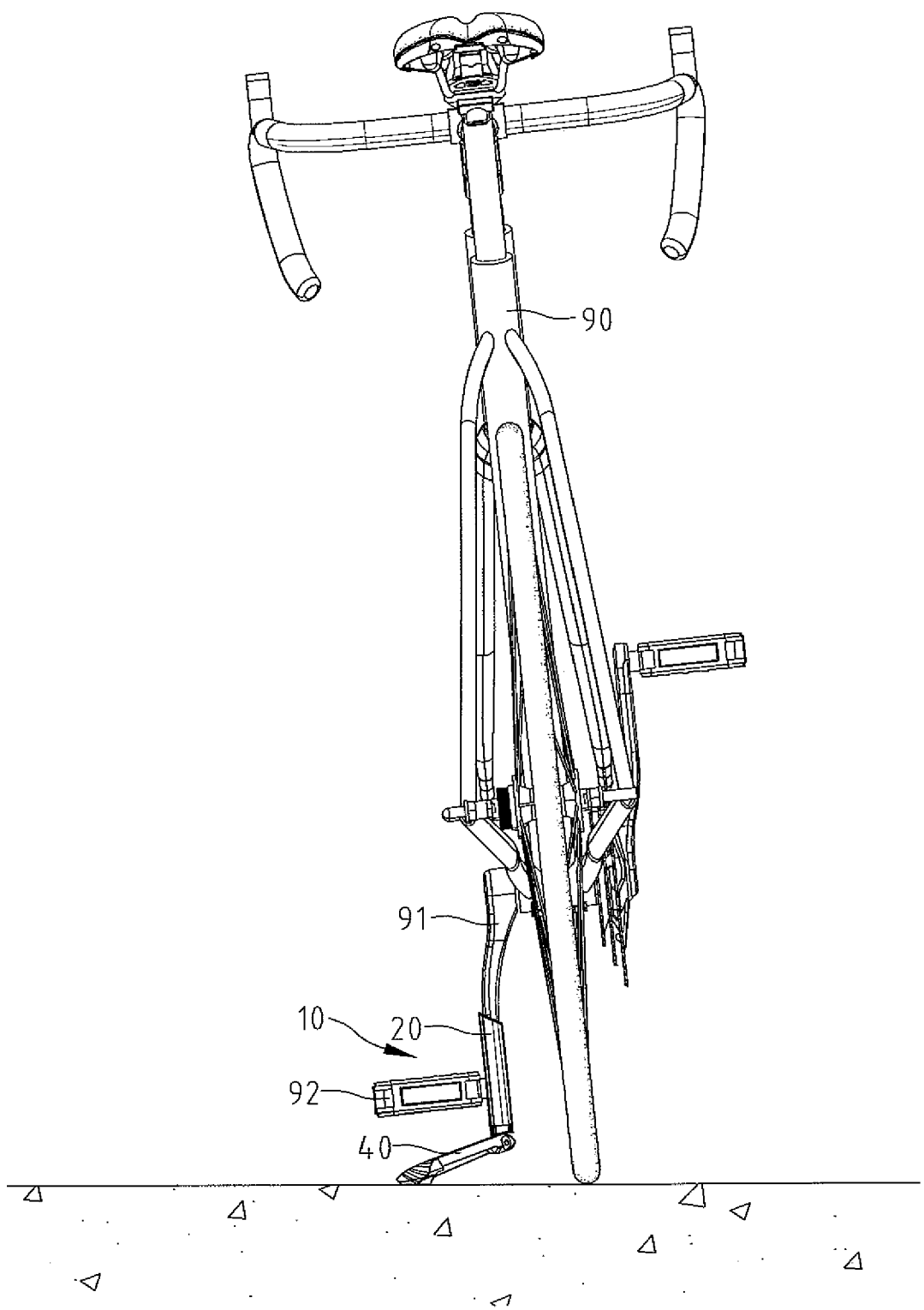
FIG. 10 is a rear elevation view of FIG. 9.
Figure 11:
FIG. 11 is a conventional stand used with a bicycle.

Referring to FIGS. 1-4 in conjunction with FIG. 9, a collapsible stand 10 for bicycle includes a body 20 having a first end, a second end, and a chamber 21 extending through the first end and the second end. That is the body 20 has two open ends. The chamber 21 is provided to receive a crank 91 of a bicycle 90 in a bicycle-supporting configuration, as best seen in FIG. 9. The body 20 also includes an indentation 22 which is in communication with the chamber 21 and extends from the first end toward the second end thereof for allowing the crank 91 and a pedal 92 of the bicycle 90 to be exposed from the body 20. A first locking portion 23 and a second locking portion 24 are also defined by the body 20. The first locking portion 23 is formed on the first end of the body 20 and is sloped. The second locking portion 24 is formed near the second end of the body 20 and on the side opposite to that where the indentation 22 is disposed. In this embodiment, the second locking portion 24 is in the form of a hole.

Figure 1:
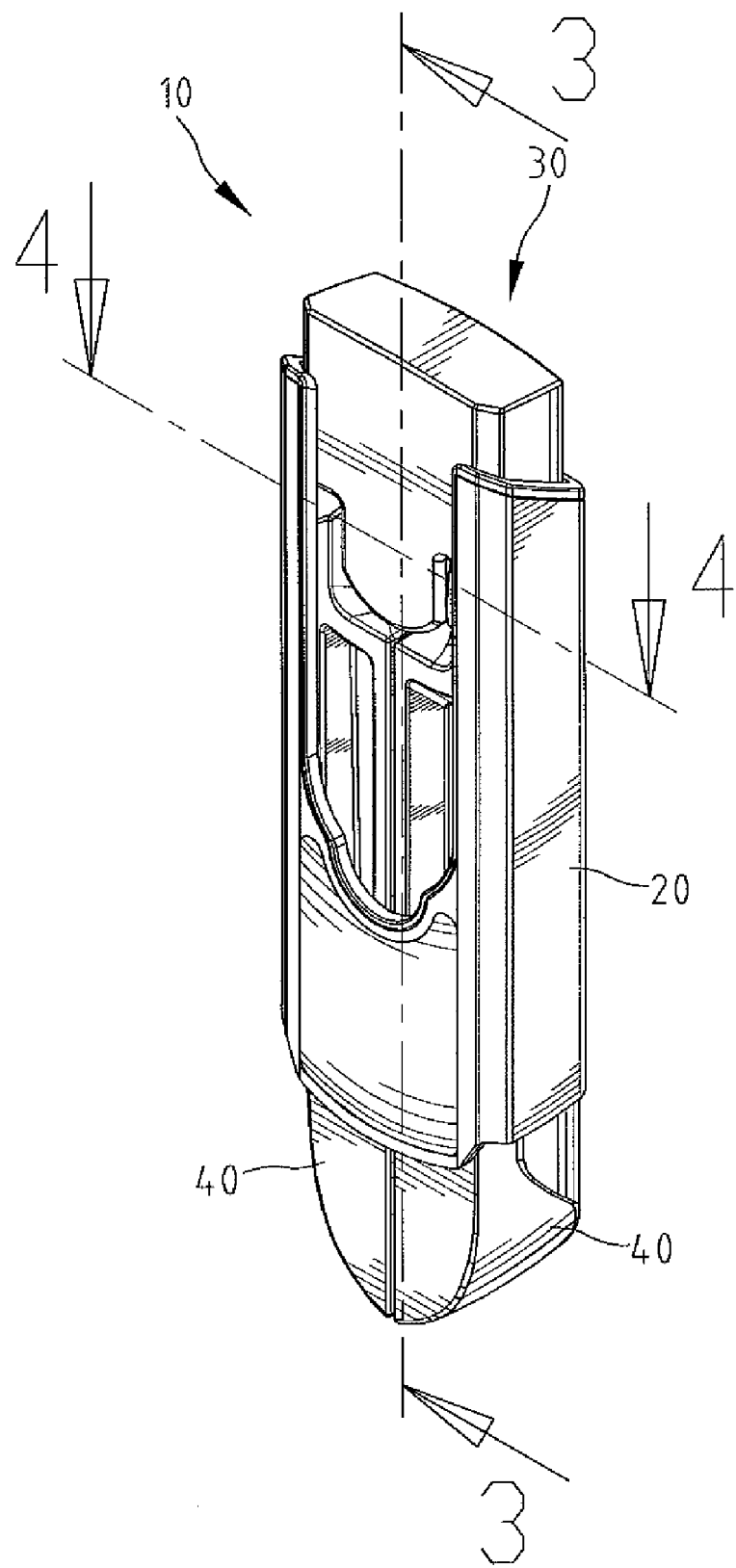
FIG. 1 is a perspective view of a collapsible stand for bicycle in accordance with the present invention.
Figure 2:
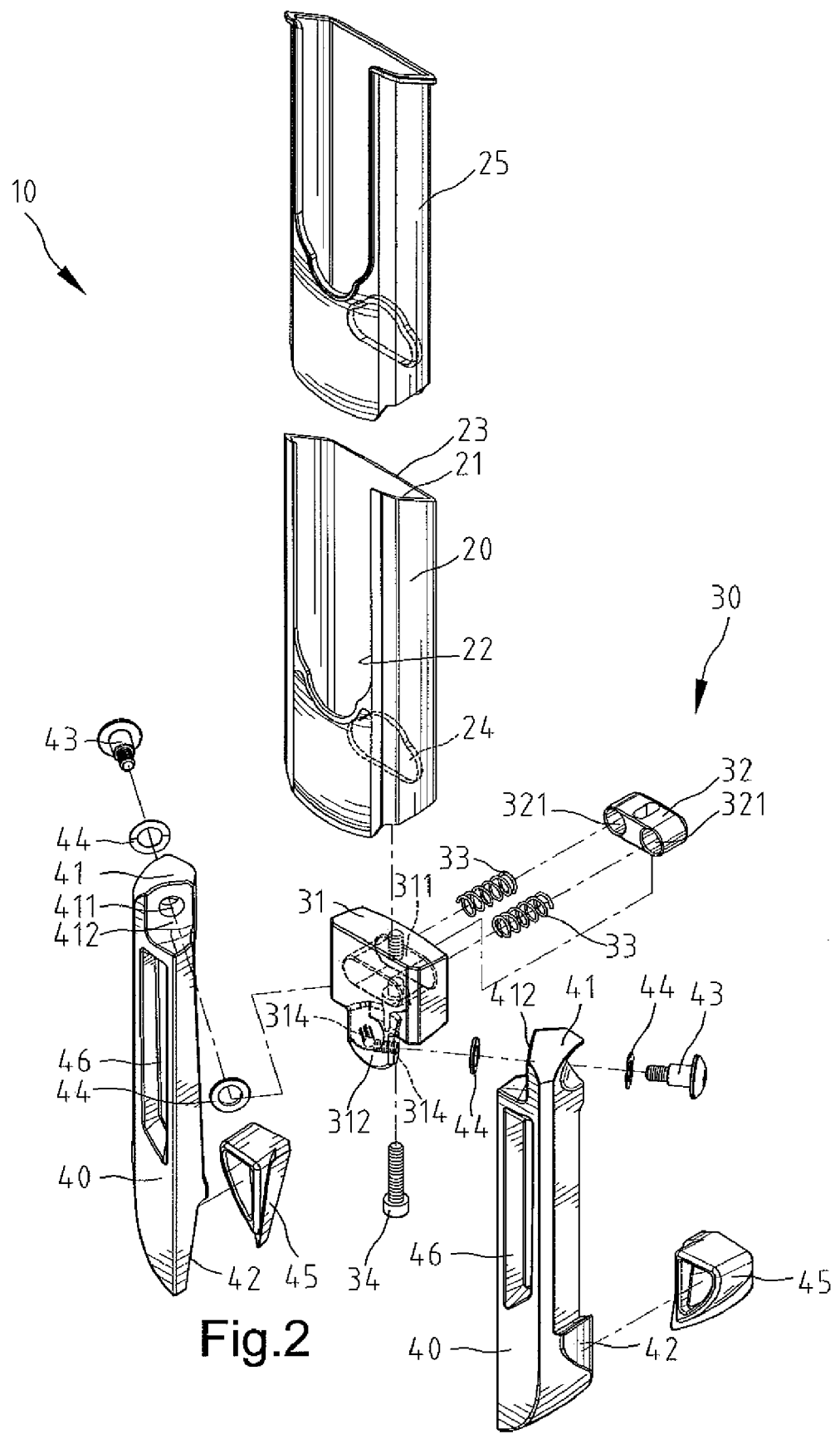
FIG. 2 is an exploded perspective view of FIG. 1.
Figure 3:
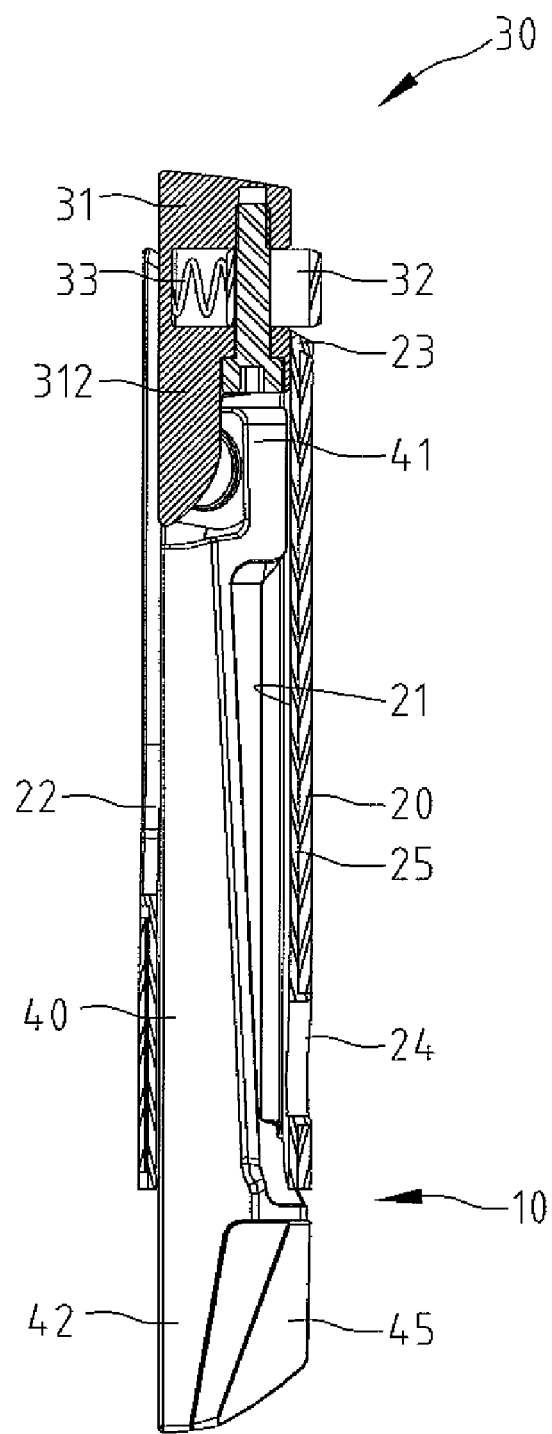
FIG. 3 is a cross-sectional view taken along line 3-3 of FIG. 1.
Figure 4:
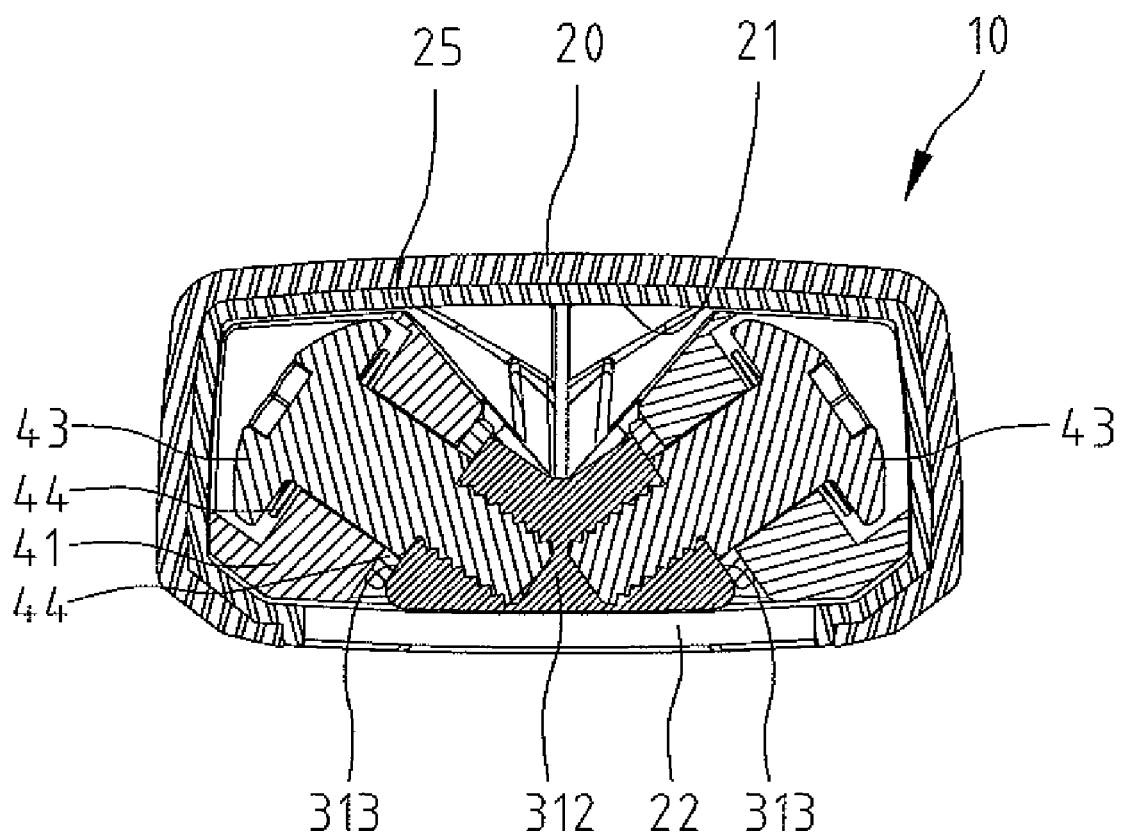
FIG. 4 is a cross-sectional view taken along line 4-4 of FIG. 1.

A positioning device 30 is movable within the chamber 21 and is selectively lockable at the first locking portion 23 and the second locking portion 24. The positioning device 30 includes a sliding block 31 which is movable within the chamber 21 and a locking element 32 installed in a cavity 311 defined by the sliding block 31. A fastener 34 is provided to connect the sliding block 31 with the locking element 32. In this embodiment, the locking element 32 includes two bores 321 defined thereof for receiving two elastic elements 33 respectively. Therefore, the locking element 32 is elastically installed within the cavity 311 of the sliding block 31. In addition, the sliding block 31 is selectively lockable at the first locking portion 23 and the second locking portion 24. The sliding block 31 also includes a tongue 312 extending from an end thereof. The tongue 312 is comprised of two slopes 313 angled with respect to each other, as best seen in FIG. 4. Each slope 313 has an engaging hole 314 defined thereon.

Two supporting legs 40, each having a first end 41 pivotally connected to the positioning device 30 and a second end 42 adapted to against a supporting surface. The first end 41 has a hole 411 defined thereon. A fixing device 43 is provided to insert through the hole 411 and the engaging hole 314 of the tongue 312 such that the supporting leg 40 is connected to the slope 313 of the tongue 312. The first end 41 also includes a connecting face 412 abuttable with slope 313. Thus the two supporting legs 40 can be pivoted with respect to the slope 313 and define an included angle therebetween. Between each supporting leg 40 and the sliding block 31, two spacers 44 are provided with one spacer 44 installed between the fixing device 43 and the supporting leg 40, with the other spacer 44 installed between the supporting leg 40 and the sliding block 30. The second end 42 may include a pad 45 attached thereto. The pad 45 provides the second end 42 a better slip-resistant and abrasion-resistant effect. Each supporting leg 40 may also has a slot 46 defined thereof for lowering its weight down.

In the preferred embodiment, the collapsible stand 10 may include a sleeve 25 installed between the body 20 and the positioning device 30. The sleeve 25 is formed of a suitable soft material, such as plastic to protect the supporting legs 40 and the positioning device 30 from abrading the body 20.

Figure 5:
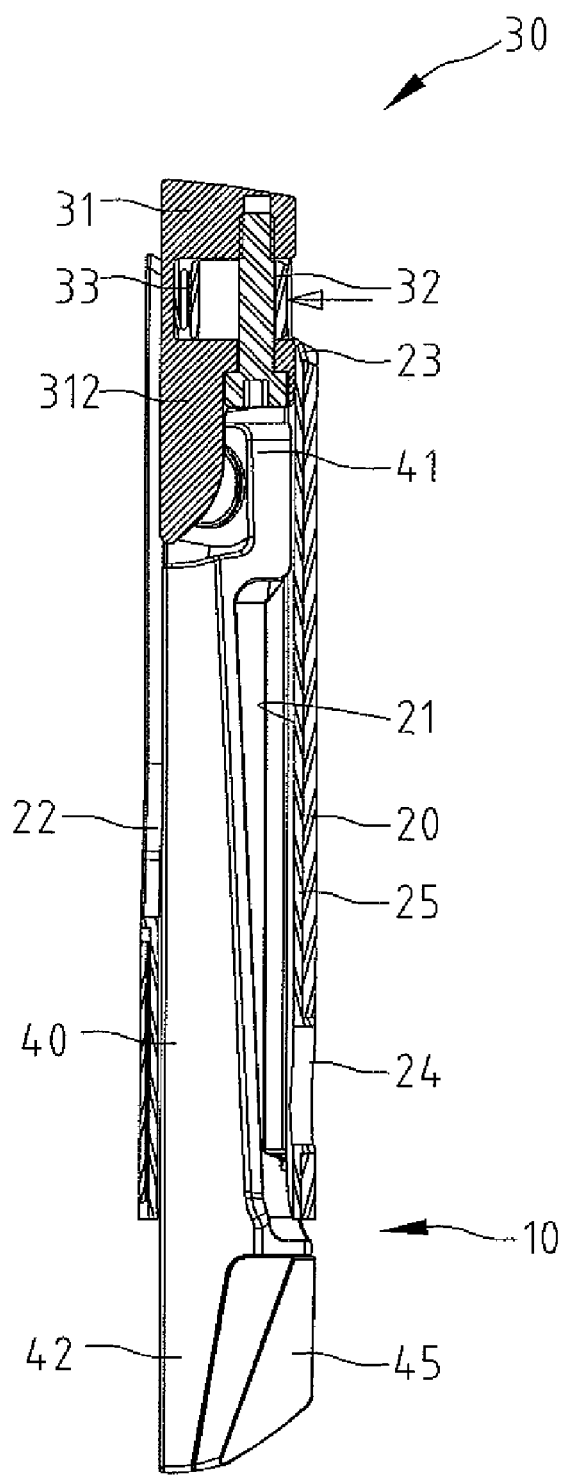
FIG. 5 is a cross-sectional view illustrating the operation of the collapsible stand.
Figure 6:
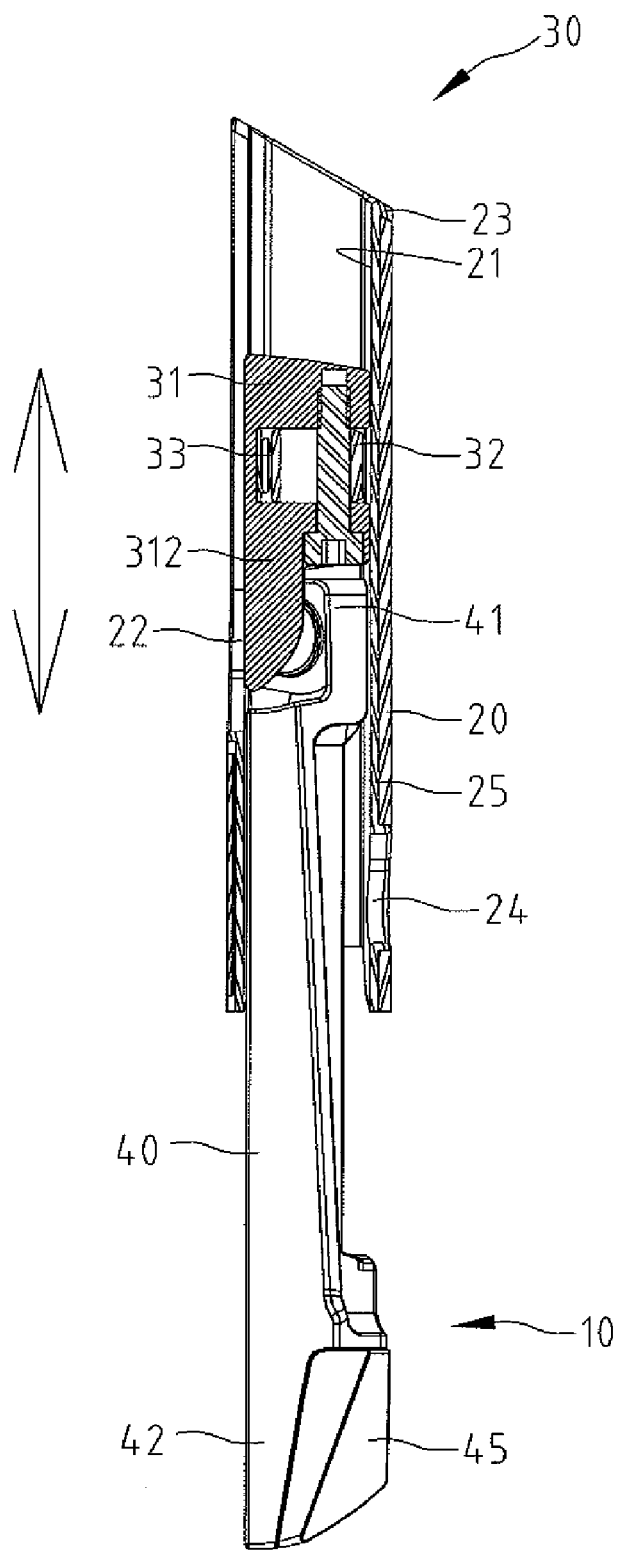
FIG. 6 is another cross-sectional view illustrating the operation of the collapsible stand.
Figure 7:
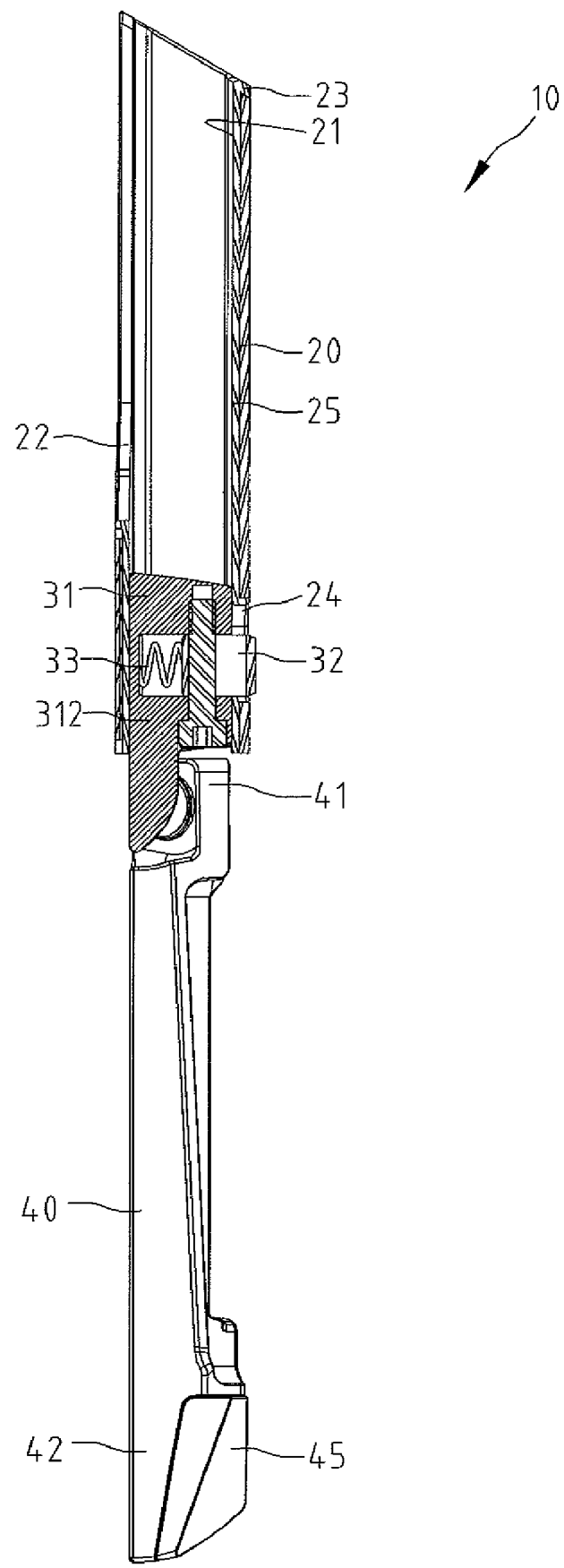
FIG. 7 is yet another cross-sectional view illustrating the operation of the collapsible stand.
Figure 8:
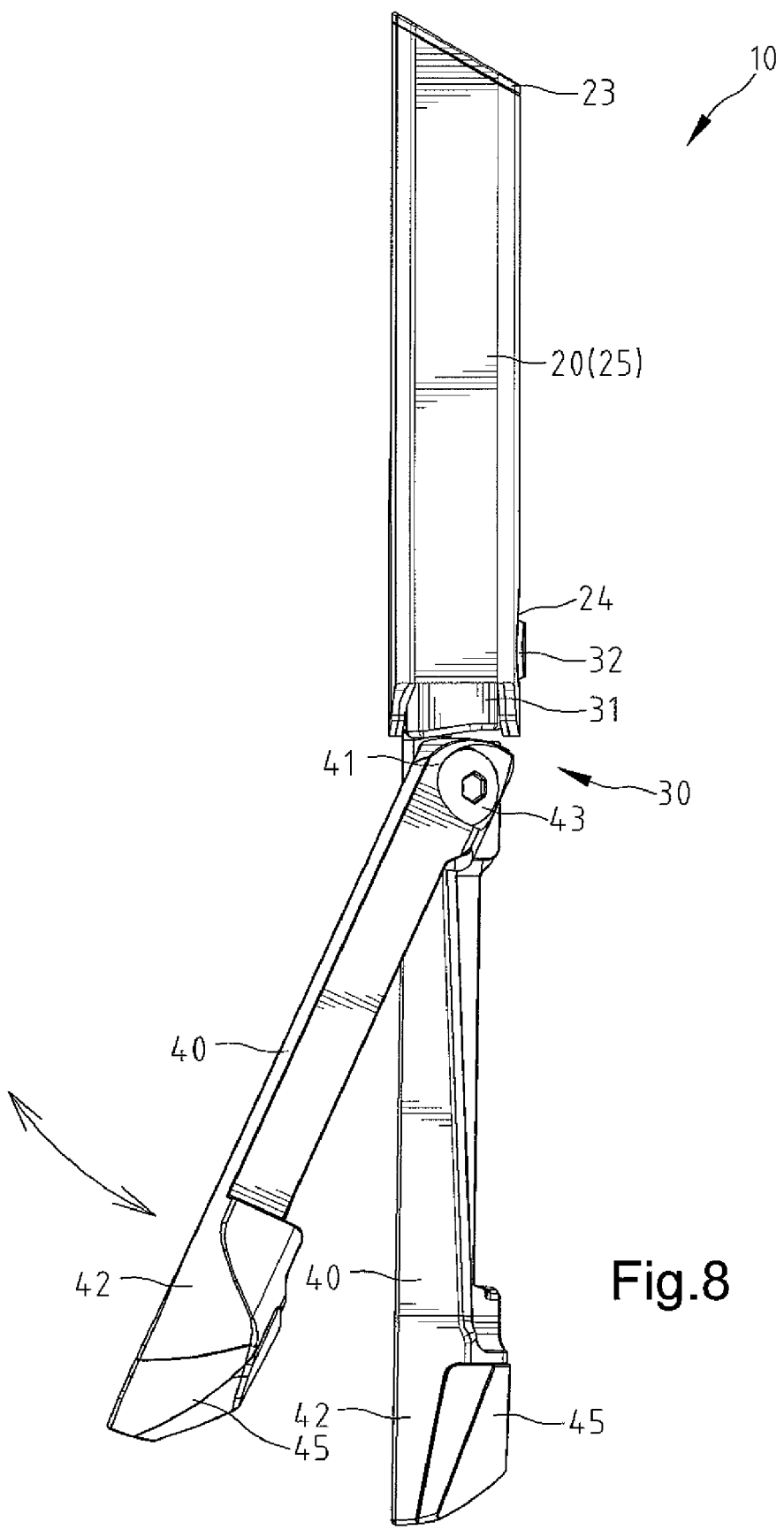
FIG. 8 is still another cross-sectional view illustrating the operation of the collapsible stand.

FIGS. 5 through 9 illustrate the operation of the collapsible stand 10, FIG. 5 shows the locking element 32 of the positioning device 30 is pressed to unlock the positioning device 30 from the first locking portion 23, FIGS. 6 and 7 show the supporting legs 40 are pulled out of the body 20 until the locking element 32 is locked by the second locking portion 24. The locking element 32 is elastically biased to extend through the second locking portion 24. FIG. 8 shows the supporting legs are pivoted with respect to the positioning device 30. FIG. 9 shows the crank 91 is installed in the body 20 in a bicycle-supporting configuration.

In view of the forgoing, one advantage of the collapsible stand of the present invention is that the two supporting legs 40 are collapsible and be stowed in the body 20 in order to facilitate convenient carrying and storage of the stand.

Another advantage is that the present invention is that the stand is light-weighted and can effectively support the bicycle 90 in an upright position.

While the specific embodiments have been illustrated and described, numerous modifications come to mind without significantly departing from the spirit of invention and the scope of invention is only limited by the scope of accompanying claims.

What is claimed is:

1. A collapsible stand for bicycle comprising:
   a body defining a first locking portion, a second locking portion, and a chamber;
   a positioning device disposed with said chamber, with said positioning device being movable within said chamber and selectively lockable to said first locking portion and second locking portion of the body; and
   two supporting legs, with each of said supporting leg including a first end being pivotally connected with said positioning device and a second end adapted to abut against a supporting surface; and
   wherein said supporting legs are received in said body when said positioning device is locked to said first locking portion; said supporting legs are exposed from the body and said chamber is adapted to receive a crank of a bicycle when said positioning device is locked to second locking portion.

2. A collapsible stand for bicycle as claimed in claim 1 wherein said positioning device includes a sliding block and a locking element, said sliding block being movable within the chamber, said locking element is elastically installed in the said sliding block and selectively lockable at said first locking portion and said second locking portion.

3. A collapsible stand for bicycle as claimed in claim 2 wherein said sliding block includes a cavity for receiving said locking element.

4. A collapsible stand for bicycle as claimed in claim 3 further includes at least one elastic element elastically installed between said sliding block and locking element, with said at least one elastic element being disposed in said cavity.

5. A collapsible stand for bicycle as claimed in claim 4 wherein said locking element includes two bores, with each of said two bores having an elastic element disposed therein.

6. A collapsible stand for bicycle as claimed in claim 2 further includes a fastener connecting said locking element with said sliding block.

7. A collapsible stand for bicycle as claimed in claim 2 wherein said sliding block includes a tongue extending from an end thereof, with said tongue being pivotally connectable to said supporting legs.

8. A collapsible stand for bicycle as claimed in claim 7 wherein said tongue includes two slopes angled with respect to each other, and each said supporting leg has said first end including a connecting face abuttable with said corresponding slope so that said supporting legs can be pivoted with respect to said slope.

9. A collapsible stand for bicycle as claimed in claim 7 further includes two fixing devices, and said tongue includes two engaging holes defined thereon, and each said supporting leg includes a hole defined on its first end, and each said fixing devices is inserted through said hole of the supporting leg and said engaging hole of the tongue so that said supporting legs are connected to said sliding block.

10. A collapsible stand for bicycle as claimed in claim 9 further includes two spacers installed between each of said supporting leg and said sliding block, with one of said spacers installed between said fixing device and supporting leg, with the other said spacer installed between said supporting leg and sliding block.

11. A collapsible stand for bicycle as claimed in claim 1 wherein said second end of each said supporting leg includes a pad attached thereto.

12. A collapsible stand for bicycle as claimed in claim 1 wherein each said supporting leg includes a slot for lowering its weight down.

13. A collapsible stand for bicycle as claimed in claim 1 wherein said body includes an indentation extending from the first end toward the second end thereof, with said indentation being in communication with said chamber.

14. A collapsible stand for bicycle as claimed in claim 1 further includes a sleeve installed between said body and positioning device.

15. A collapsible stand for bicycle as claimed in claim 1 wherein the first locking portion is sloped, and the second locking portion is in the form of a hole.

* * * * *